(12) United States Patent
Avent

(10) Patent No.: US 9,573,058 B2
(45) Date of Patent: Feb. 21, 2017

(54) INTERACTIVE COMPUTER GAME

(75) Inventor: Jason Avent, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 2427 days.

(21) Appl. No.: 12/022,000

(22) Filed: Jan. 29, 2008

(65) Prior Publication Data

US 2009/0191971 A1     Jul. 30, 2009

(51) Int. Cl.
*A63F 9/24*     (2006.01)
*A63F 13/335*     (2014.01)

(52) U.S. Cl.
CPC ........ *A63F 13/335* (2014.09); *A63F 2300/577* (2013.01)

(58) Field of Classification Search
CPC .... A63F 13/00; A63F 2300/577; A63F 13/21; A63F 13/213; A63F 13/216; A63F 13/218; A63F 13/28; A63F 13/40; A63F 13/45; A63F 2300/69; A63F 2300/80
USPC ...................................... 463/40, 42
See application file for complete search history.

(56) References Cited

U.S. PATENT DOCUMENTS

| | | | | |
|---|---|---|---|---|
| 5,269,687 A | * | 12/1993 | Mott ........................ | A63F 13/10 273/454 |
| 5,354,202 A | * | 10/1994 | Moncrief ................ | A63F 13/10 273/454 |
| 5,366,376 A | * | 11/1994 | Copperman .......... | A63F 13/005 273/148 B |
| 5,577,913 A | * | 11/1996 | Moncrief ................ | A63F 13/10 273/454 |

(Continued)

FOREIGN PATENT DOCUMENTS

| EP | 1262217 A2 | 1/2002 |
|---|---|---|
| EP | 1637197 A1 | 3/2006 |
| WO | 02068075 A1 | 9/2002 |

OTHER PUBLICATIONS

International Search Report, Jun. 12, 2009, PCT/US2009/031535, European Patent Office.

(Continued)

*Primary Examiner* — David L Lewis
*Assistant Examiner* — Matthew D. Hoel
(74) *Attorney, Agent, or Firm* — Marsh Fischmann & Breyfogle LLP; Kent A. Lembke

(57) ABSTRACT

A computer game terminal, and associated method and code, for operating an online interactive computer game. The terminal includes an interface receiving non-interactive user input data from a controller associated with the computer games terminal and an interface receiving interactive game data associated with at least one interactive game element. The terminal includes a display driver rendering a graphical representation of a computer game based on the non-interactive user input data and the interactive game data. The terminal includes a processor processing the received non-interactive user input data and the interactive game data, while inhibiting data interaction. The processing inhibits interaction between a displayed avatar associated with the user input data and a displayed avatar associated with the received interactive game data. A network interface is included to transmit user input data from the controller associated with the terminal but operable in a non-interactive mode to inhibit such transmission.

20 Claims, 7 Drawing Sheets

(56) References Cited

U.S. PATENT DOCUMENTS

| | | | |
|---|---|---|---|
| 5,660,547 A * | 8/1997 | Copperman | A63F 13/10 |
| | | | 434/29 |
| 6,080,063 A | 6/2000 | Khosla | |
| 2002/0183115 A1 | 12/2002 | Takahashi et al. | |
| 2003/0038805 A1 | 2/2003 | Wong et al. | |
| 2003/0054869 A1* | 3/2003 | Hightower | 463/6 |
| 2003/0220143 A1 | 11/2003 | Shteyn et al. | |
| 2007/0117617 A1 | 5/2007 | Spanton et al. | |
| 2009/0011831 A1* | 1/2009 | Yamada | 463/37 |

OTHER PUBLICATIONS

PCT International Search Report, PCT/US2009/031459, dated Mar. 19, 2009.

\* cited by examiner

INTERACTIVE COMPUTER GAME

CROSS-REFERENCE TO RELATED APPLICATIONS

This application is related to co-pending U.S. patent application Ser. No. 12/022,340, filed Jan. 30, 2008, entitled "Interactive Computer Game," and incorporated herein by reference in its entirety.

BACKGROUND OF THE INVENTION

Field of the Invention

The invention is concerned with interactive computer games, and in particular with interactive computer games where multiple users may play an interactive computer game together. The invention is particularly, but not exclusively, concerned with the provision of interactive computer games in which multiple users are connected via a network such as the Internet.

Description of the Related Art

The general architecture to support an interactive computer gaming session between multiple users in a network environment is illustrated in FIG. 1. Such an architecture, and variations thereto, is well-known to one skilled in the art.

FIG. 1 illustrates three computer game systems 2a, 2b, 2c. Each system is connected to a network 6 via a respective network connection 4a, 4b, 4c. The network 6 may be the Internet. A server 8, supporting a player matching service, is also connected to the network 6 via a network connection 10. As illustrated with reference to computer game system 2a, each computer game system typically includes a computer game console 12 or hardware device, a player/user input device or controller 18 connected to the computer game hardware device 12, and a display 20 connected to the computer game hardware device. The computer game console 12 is adapted for connection to the network connection 4a. Although in the example shown the controller 18 and display 20 are shown as distinct from the console 12, the computer game system may be implemented in a variety of ways, for example with the controller, display and console forming a single integrated device.

The player matching service provided by the server 8 allows for details of interactive games to be uploaded thereto, so as they may be displayed to other users. A games player, such as a games player associated with computer game system 2a, may initiate a new interactive game, and upload details to the server 8. The purpose of the player matching service is to enable other players to join the initiated game. The game matching service may display such details as the identity of the game to be played, the identity of the game host (i.e., the games player initiating the game), and details of any other games players who have registered to play the game. The gaming matching service operates to facilitate matching of players for an interactive game session, and has no involvement in the playing of the game.

The initiation of the game with the player matching service creates a so-called lobby for the game. On a player accessing the player matching service and registering to play a game, in accordance with various known techniques, a suitable screen is displayed to the player. The screen may display, for example, the identity of all players of the game, showing game details and options, and a list of game players. Games may be associated with a maximum number of players, which may be limited by the game application or by the game host. In dependence on the number of players that may be involved in a game, a number of so-called slots for the game are made available. Once the maximum number of players for the game is reached, all slots are filled and the lobby is closed to new players.

Once the players for the game are registered and the lobby closed, the communication between the computer game systems of the registered players is on a peer-to-peer network basis. The specific communications between the computer game systems during a game may vary. Each computer game system operates autonomously and generates its own graphics for display, based on information received on the peer-to-peer network. Each computer game system therefore needs to receive data associated with user inputs from all other players in the game. This may be done by each computer game system transmitting the user input data at its terminal to all other players, for example, or by all computer game systems transmitting their data to the host system, which in turn transmits it to the other computer game terminals. The former is preferable.

Each computer game system thus preferably broadcasts its user input data to the other computer game systems involved in the interactive game session. This broadcast is limited insofar as the data is only transmitted to the other computer game terminals in the game. For this purpose each computer game system may receive, as part of the initialization process in the lobby, the data address (such as the IP address) of each other computer game system. All data transmitted from a computer game system is then transmitted with the addresses of all computer game systems.

Each computer game system processes the game data, in conjunction with the data received from other computer game systems, individually, and renders the game graphics to its associated display. Each system requires the user input data of all other games systems for the interactive game to operate.

Problems exist with current networked multi-user interactive game applications such as described above.

Game sessions are locked to new players once a game is underway. This means that the number of games available and listed to play at the player matching service is limited, as it does not show those games for which a session is currently underway. It is not possible for a player to register with a game that is underway.

If games that are underway are listed, and therefore a player can register with the game, the player can only watch the existing game until it is finished. Only thereafter may they take part.

For certain players, it may be undesirable to join an interactive game, due to a lower skill level than other players involved in the game. The only way in which a games player can develop skills in the game may be to join a networked interactive game in which the skill levels of the other games players is significantly higher.

For players of low skill levels, such as players new to the game or learning the game, their participation in a networked interactive game may be detrimental to other players, since their lack of skills may results in collisions that interfere with game playing for more skilled players.

SUMMARY OF THE INVENTION

The invention provides a method of operating an interactive computer game on a computer games terminal, comprising the steps of: receiving, at the computer games terminal: non-interactive user input data from a controller associated with the computer games terminal; interactive game data associated with at least one interactive game element; rendering the non-interactive user input data and the interactive game data for display.

The interactive game data is preferably all the data necessary to render an interactive game.

A computer games player is thus able to play a real-time interactive game without interfering with the game.

A computer game player is thus able also to replay a previous game. The previous game may be stored or downloaded. The interactive game data may comprise the data of the previous game.

The method may further include the step of inhibiting any interaction between the non-interactive user input data and the interactive game data. Thus a non-interactive player can continue a game regardless of any collision with an interactive game element, such collision being ignored.

The step of rendering the non-interactive user input data and the interactive game data for display is preferably independent of any interaction between said data. Thus if a game element of a non-interactive player collides with an active game element, any usual processing or rendering following such collision is inhibited.

The step of rendering the non-interactive user input data and the interactive game data for display is preferably adapted to detect a coincidence between the position of an avatar for display associated with the user input data and an avatar for display associated with the received interactive game data, and responsive thereto to render both avatars as visible.

An avatar is understood by one skilled in the art, and may be considered to be a displayed graphic representing an active element of a game, preferably a user controlled active element.

The method further comprises processing the received user input data and the interactive game data, the processing step being adapted to inhibit any interaction between a displayed avatar associated with the user input data and a displayed avatar associated with the received interactive game data.

The method may further include a step of inhibiting the transmission of the non-interactive user input data. The step of inhibiting comprises inhibiting transmission to a network.

The interactive game data may be real-time interactive game data. The interactive game data may be pre-stored interactive game data. The interactive game data may include user input data from at least one further computer games terminal. The non-interactive user data may be associated with a user being a non-active game player. The step of receiving interactive game data may include receiving said data from a network.

The invention provides a computer game terminal for operating an interactive computer game, comprising: an interface for receiving non-interactive user input data from a controller associated with the computer games terminal; an interface for receiving interactive game data associated with at least one interactive game element; and a display driver for rendering a graphical representation of a computer game based on the non-interactive user input data and the interactive game data.

The computer game terminal may further include a processor for processing the received non-interactive user input data and the interactive game data, the processor being adapted to inhibit any interaction between such data.

The computer game terminal may further include a processor for processing the received non-interactive user input data and the interactive game data, the processing being adapted to inhibit any interaction between a displayed avatar associated with the user input data and a displayed avatar associated with the received interactive game data.

The interface for receiving interactive game data may be a network interface.

The interactive game data may be user input data associated with a further computer game terminal. The interactive game data may be associated with a computer-generated interactive game element.

The computer game terminal may further comprise an interface for transmitting user input data from the controller associated with the computer games terminal, said interface being arranged in a non-interactive mode of operation to inhibit said transmission.

The invention provides a computer program (e.g., computer readable media storing code for causing a computer(s) or processor(s) to effect or perform a method) for operating an interactive computer game on a computer games terminal and for carrying out a method comprising the steps of: receiving, at the computer games terminal: non-interactive user input data from a controller associated with the computer games terminal; interactive game data associated with at least one interactive game element; rendering the non-interactive user input data and the interactive game data for display.

The invention provides a computer program product for storing computer program code for carrying out a method of operating an interactive computer game on a computer games terminal, comprising the steps of: receiving, at the computer games terminal: non-interactive user input data from a controller associated with the computer games terminal and interactive game data associated with at least one interactive game element; and rendering the non-interactive user input data and the interactive game data for display.

The invention provides a method of operating an interactive computer game on a plurality of computer game terminals, comprising the steps of: receiving, at a first computer games terminal: non-interactive user input data from a controller associated with the first computer games terminal; and interactive user input data from a controller or controllers associated with a plurality of second computer games terminal; rendering a graphical representation of the computer game at the first computer game terminal based on the non-interactive user input data and the interactive user input data; receiving, at each second computer games terminal: interactive user input data from a controller associated with the second computer games terminal; and interactive user input data from a controller associated with at least one further second computer games terminal; and rendering a graphical representation of the computer game at each second computer game terminal based on the interactive user input data of each second computer games terminal.

The invention provides a network of interconnected computer games terminals each adapted for operating an interactive computer game, the network comprising: a plurality of first computer game terminals, each comprising: an interface for receiving interactive user input data from a controller associated with the computer games terminal; an interface for receiving interactive user input data from a controller associated with the plurality of other first computer game terminals; a display driver for rendering a graphical representation of a computer game based on the interactive user input data of each of the plurality of first computer game terminals; and at least one second computer game terminal, each comprising: an interface for receiving non-interactive user input data from a controller associated with the second computer game terminal; an interface for receiving interactive user input data from each of the plurality of first terminals; and a display driver for rendering a graphical representation of the computer game based on the non-interactive user input data of the second computer game terminal and the interactive user input data of each of the first computer game terminals.

BRIEF DESCRIPTION OF THE FIGURES

The invention will now be described by way of example with reference to the accompanying Figures, in which.

DESCRIPTION OF PREFERRED EMBODIMENTS

The invention is described herein by way of reference to particular examples and preferred embodiments. The invention is not limited to any aspects of such examples and preferred embodiments. The examples and preferred embodiments are presented for the purpose of illustrating the concepts of the invention and for ease of understanding of the invention and do not limit the scope of the invention.

In one arrangement, a game application is modified to allow inclusion of a so-called non-interactive player. The game application is adapted to allow registration of non-interactive players. The non-interactive player registers with the game in the usual way, but specifically as a non-interactive player.

In one preferred arrangement, the presence of the non-interactive player is hidden from any interactive game player. This preferred arrangement is described further with reference to FIGS. 2 and 3.

Figure 1:
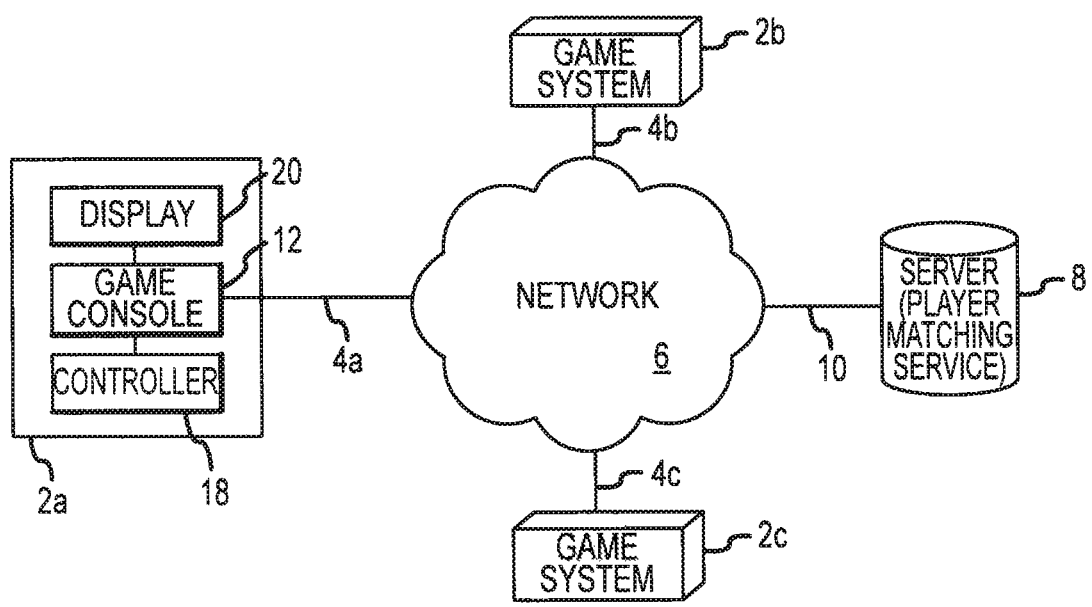
FIG. 1 illustrates a general architecture to support an interactive computer gaming session between multiple users in a network environment as known in the art.
Figure 2:
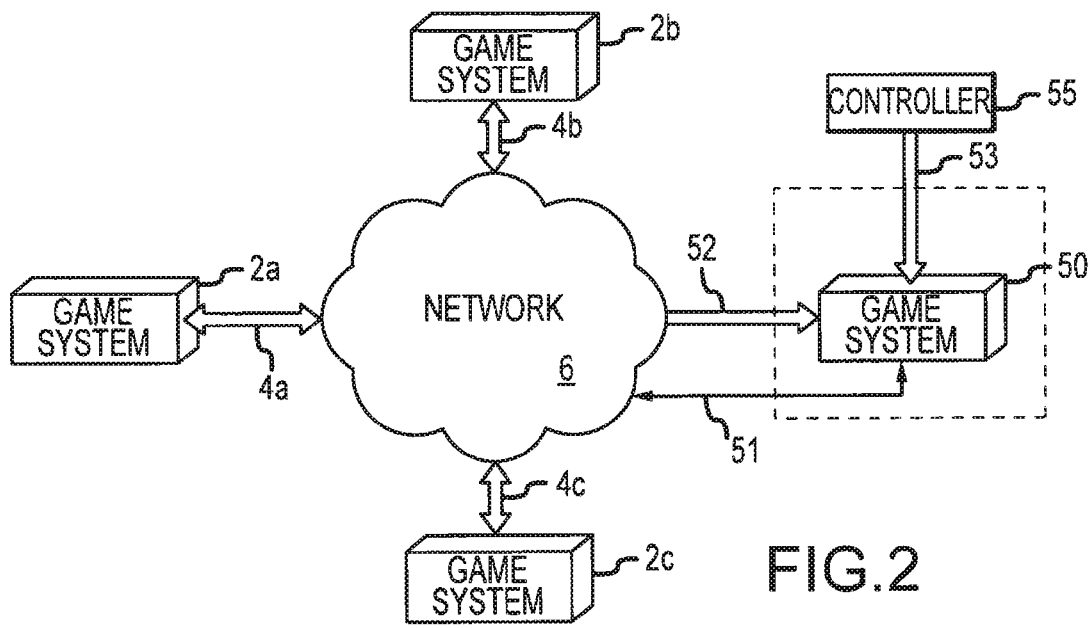
FIG. 2 illustrates an architecture to support an interactive computer gaming session between multiple users in a network environment adapted in accordance with an embodiment of the invention.

With reference to FIG. 2 there is illustrated a network environment of FIG. 1, including game systems 2a, 2b and 2c. In accordance with techniques known in the art, each of the game systems 2a, 2b and 2c is registered to play an interactive game, one of the game systems being the game host. The set-up, registration, and initiation of such an interactive game in a networked environment are well understood by one skilled in the art.

In addition in FIG. 2, there is shown a game system 50 associated with a non-interactive game player. The non interactive game player registers to play the interactive game in accordance with a preferred arrangement but does not become an interactive game player for the game. Bi-directional interface 51 represents an exchange of control information.

Upon registration, the details of the non-interactive player and the game system 50 of the non-interactive player are registered and stored with the details of interactive players in the usual way. The address of the non-interactive player is included as an address to which the computer game systems 2a, 2b, 2c of active players should transmit (or broadcast) their data.

Thus the registration for an interactive game is modified such that a games player may register as either an interactive player or a non-interactive player. In the event that all game slots are filled, and therefore the option to register as an interactive player is not available, the games player will only have the option to register as a non-interactive player.

Once registration is complete for all games players, and the game is ready to begin, the details of all interactive games players are provided to the game systems of each interactive player. This may simply involve providing each game system with the address (such as the IP address) of all other interactive game systems participating in the interactive game. In this way each interactive game system can transmit (or broadcast) their data to the other interactive game systems. Such distribution of information to the game systems on completion of registration for the game is known to one skilled in the art.

In accordance with this preferred arrangement, each of the interactive game systems is additionally provided with the address of a game system associated with any non-interactive, but registered, games player. In this way, the interactive games data from each game system is transmitted (or broadcast) to the game systems associated with non-interactive games players.

In the example architecture of FIG. 2, the games system 50 associated with a non-interactive player receives their interactive game data on network interface 52.

As the game system 50 associated with a non-interactive player is not interactively involved in the game, there is no requirement for the game system 50 to be provided with the addresses of the interactive game systems 2a, 2b, 2c. Alternatively, the addresses of all interactive game systems and non-interactive game systems may be provided to all game systems registered, but any game system which is registered as a non-interactive game system may additionally be provided with an instruction to disable transmission of the games data. Alternatively, all games systems may transmit data, with the interactive game systems adapted to ignore any transmissions from a non-interactive game system.

In addition to receiving the interactive games data on network interface 52, the games system 50 receives user input data on controller interface 53 from controller 55. The user input data on controller interface 53 is that of the non-interactive games player using games system 50.

A characteristic of the architecture required for this preferred arrangement is that the interactive game systems operate as normal to render the interactive game to their respective displays. Any non-interactive game system similarly operates conventionally to render the interactive game to its associated display. In addition, however, any non-interactive game system renders additional information based on user input data provided by the non-interactive games player associated with a non-interactive game system. Thus, in effect, the non-interactive games player plays alongside the interactive game, and this is rendered to the display of the non-interactive games player, but the non-interactive games player data is not rendered to the displays of the interactive games players by their respective game systems.

A further preferred characteristic is that the non-interactive game system prevents interaction between a game element controlled by the non-interactive player and any interactive game element.

Thus, the computer game system of a non-interactive player receives the broadcast game information and is able to render that to the display of the computer game console of the non-interactive player.

Figure 3:
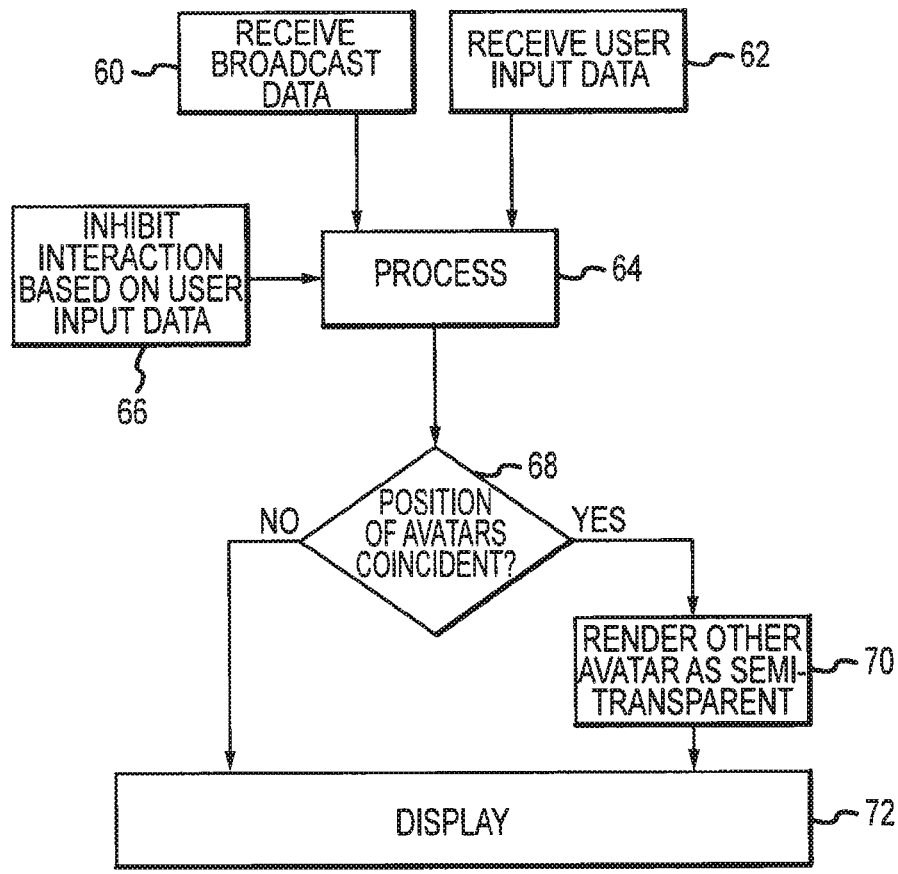
FIG. 3 shows a flow diagram of the main process steps for adapting a computer games system for the architecture of FIG. 2.

The operation of the game system 50 in accordance with this preferred arrangement is described further with reference to the flow process chart of FIG. 3.

As denoted by step 60, the game system 50 receives the broadcast data from the game systems of the interactive players, such as game systems 2a, 2b, 2c. This data is received on the network interface 52. In addition, as denoted by step 62, the game system 50 receives user input data. The user input data is provided on interface 53 from controller 55. As discussed hereinabove, the controller 55 may be integral to the game system 50 or may be connected thereto. In FIG. 2, the controller 55 is shown as being separate but connected to the game system 50. This is merely illustrative.

In a step 64, the game system 50 processes the received data. The process operation is a conventional operation for the game system 50 to operate on the received games data to render a graphical image to the game system display. In accordance with this preferred arrangement, the process 64 receives an additional input from a step 66, which is an instruction to inhibit interaction based on any received user input data. As the non-interactive player is not an interactive player of the game, any interaction between that player and the interactive players is preferably inhibited.

As is conventional, the computer game system of the non-interactive player renders an avatar to the display of the non-interactive player's computer game system 50, being the avatar associated with the non-interactive player, as well as rendering the avatars of the interactive games players based on the data received in step 60. The non-interactive player may thus play alongside the interactive game, but the avatar is only displayed on their display as their data is not transmitted to or rendered by the other players' computer game systems 2a, 2b, 2c.

In order to ensure that the non-interactive player, whose avatar is not displayed on the other computer game displays, cannot interfere with the interactive game, no collisions or interference of their avatar with other active aspects of the game are permitted. Thus, for example, in a car racing game, if the avatar of the non-interactive player collides with the avatar of an interactive player, on the display of the non-interactive player the avatar is shown as 'ghosting' through the other avatar. This may be achieved by rendering the avatar of either the non-interactive player or the interactive player as semi-transparent on the non-interactive players display but with both images still otherwise fully rendered.

This is implemented in a step 68. In a step 68 the game system 50 determines whether the position of a user avatar coincides with that of another avatar or active game element. As to what is meant by "coincides" may be determined on an implementation basis. Thus it may be determined that the position of a user avatar and an interactive avatar coincide if they are within a certain proximity of each other, or it may only be decided that they coincide if they at least partially overlap.

If it is determined in step 68 that the position of a user avatar and an interactive avatar coincide, then in a step 70 the interactive avatar is preferably rendered as semi-transparent (or this may be reversed with the user avatar rendered as semi-transparent). Thus the avatar associated with a non-interactive user, which the non-interactive user controls, remains unchanged, but the interactive element with which a coincidence has taken place is rendered semi-transparent.

After either step 68 or step 70 the computer game system 50 renders the process data to the display (or provides a signal providing the processed data to the display (e.g., a monitor of any of a number configurations) of the system 50), as denoted by step 72.

Thus the game system 50 of a non-interactive games player is adapted in order to control the images rendered to the display of the game system 50 so as no interaction with the interactive game takes place. The game systems of the interactive games players operate as is conventional and are unaffected by the operation of the game system 50.

A non-interactive player may join the game from the start. In such a way, a player may join as a non-interactive player from the start of the game and play the full game. The non-interactive player may join in the game lobby. This may be advantageous to a player to allow them to practice, for example, against good players without having to identify themselves. This may be particularly advantageous where a player is learning the game or trying to improve their skills to be more competitive with better players. Where a non-interactive player joins for the start of the game, the game data—such as fastest lap time—for the player may still be retained as game data.

A non-interactive player may alternatively join the game whilst it is underway. Thus the advantages of being in the game may similarly be gained. In addition, this allows a player who wants to actively take part in a game the option of maintaining their interest, or practicing, whilst they wait for a next game to start. Where a non-interactive player joins a game which is underway, their avatar may be introduced alongside whatever current action is taking place. In a car racing game, for example, their avatar may receive a 'rolling start' alongside the interactive avatars of other players.

There may be a plurality of non-interactive players. Each non-interactive player may receive the broadcast data from the active players. The computer game system of the non-interactive player renders this on the display of the non-interactive display, and additionally renders the user inputs from the non-interactive player. In this way multiple non-interactive players may play an interactive game as a non-active player, only seeing their own avatar added to the interactive game, and not being able to interact with the interactive game.

Thus in this arrangement a non-interactive player is able to play a game alongside interactive players, but the non-interactive player's presence is unknown to the interactive players of the interactive game, and does not interfere with the interactive game.

The preferred arrangements described with reference to FIGS. 2 and 3 has been described in the context of a non-interactive user playing alongside an interactive game in which there are a plurality of interactive users. This arrangement is not limited, however, to an interactive game comprising a plurality of users. The non-interactive player may play alongside an interactive game which has one or more interactive elements, and the interactive elements may be system or game controlled rather than user controlled.

In this arrangement there is thus provided a method of controlling an interactive computer game in which a plurality of users control a respective plurality of game characters, including, for example: a first display associated with a first user and a second display associated with a second user. In this example, a game character or characters associated with one or more first users may be displayed on both the first and second display. Also, a game character associated with a second user may be displayed on only the second display, and the first and second user characters do not interact.

In this arrangement, there is thus also provided a method of playing an interactive computer game that includes: receiving interactive game data associated with at least one active user of the interactive game: receiving user inputs from an inactive user; displaying the interactive game in dependence on the received interactive game data and the received user inputs.

In this arrangement, there is thus also provided a method of playing an interactive computer game that includes: receiving interactive game data associated with at least one active user of the interactive game; receiving interactive game data associated with at least one non-active user of the interactive game; and displaying the interactive game in dependence on the received interactive game data and the received user inputs. In this arrangement, the user inputs of the non-active player are preferably not allowed to cause an interaction with an active element of the interactive game.

Figure 4A:
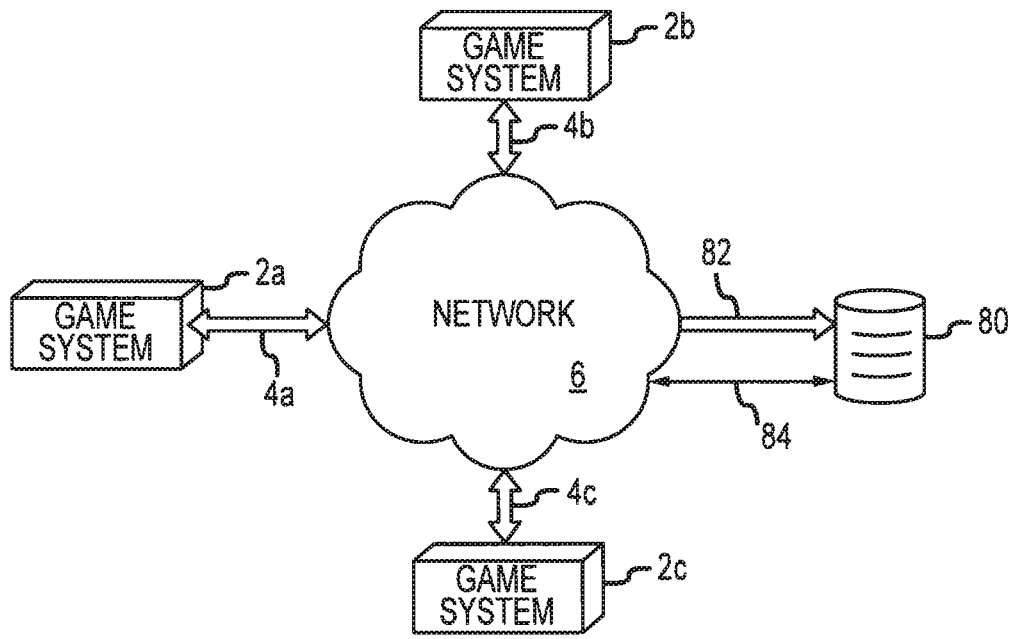
FIGS. 4(a) and 4(b) illustrate an architecture to support an interactive computer gaming session between multiple users in a network environment adapted in accordance with a further embodiment of the invention.

In another arrangement, a game application is modified to allow a non-interactive player to play in a previous interactive game. This preferred arrangement is described with reference to FIGS. 4 and 5.

With reference to FIG. 4a, there is again illustrated the general network architecture of FIG. 1 showing game systems 2a, 2b and 2c associated with interactive games players. In addition, there is illustrated a server 80, which receives data from the network on a network interface 82 and communicates control information with other elements attached to the network via bi-directional communication interface 84.

In this arrangement, the server 80 is adapted to run an application that receives all game data for the interactive game on network interface 82. Thus, an application running on the server 80 may register for the interactive game using bi-directional control interface 84 as a non-interactive player in order to receive the game data. The interactive game data is then stored on the server 80. Other techniques for the server 80 to receive the game data may be possible, such as, for example, all games initiated using the interactive gaming system being transmitted thereto.

The server 80 thus stores data associated with played interactive games. This data may be made available at a later date as discussed below.

Figure 5A:
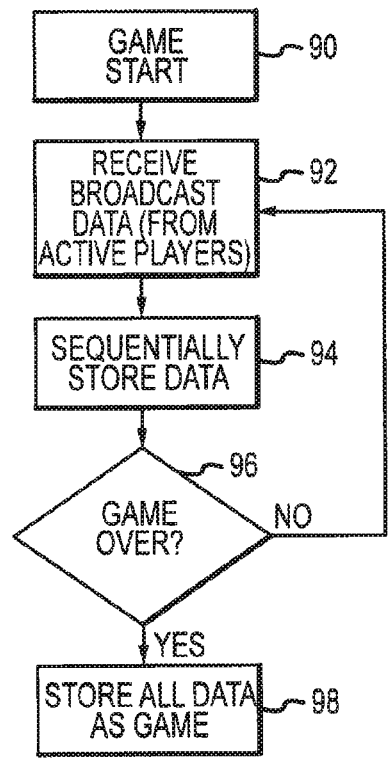
FIGS. 5(a) and 5(b) show flow diagrams of the main process steps for adapting a computer games system for the architecture of FIGS. 4(a) and 4(b)

The operation of the server 80 in accordance with this arrangement is described further with reference to the flow chart of FIG. 5a. In a step 90 the game starts, and then in a step 92 the server 80 receives broadcast data from the interactive game on interface 82. In a step 94 the server 80 sequentially stores the interactive data or stores the data with appropriate time information. In a step 96 it is determined whether the game is completed. If the game is not completed, then the process returns to step 92 and 94. If the game is completed, then in a step 98 the game is marked as completed and stored as a completed previous game.

Figure 4B:
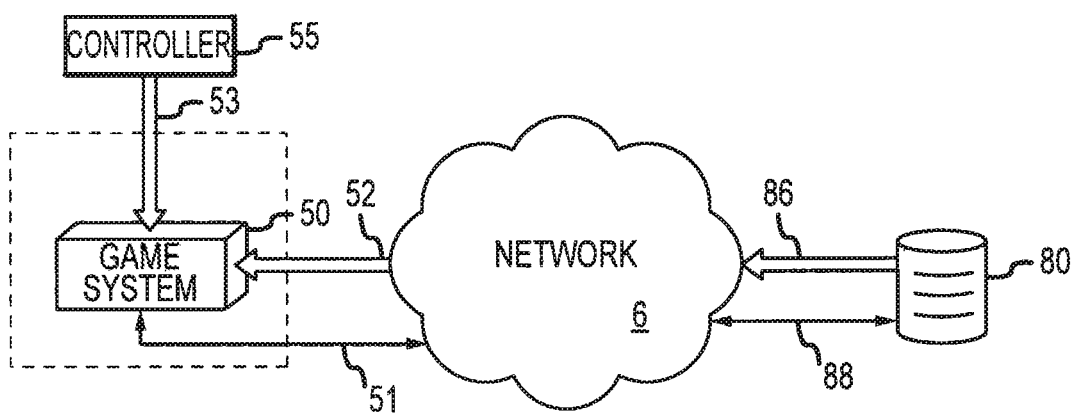

The server 80 may be accessed in order to obtain a previously player interactive game. With reference to FIG. 4b this is described further.

FIG. 4b shows a non-interactive game system 50, such as the non-interactive game system 50 of FIG. 2, associated with a non-interactive games player. Under the control of the non-interactive games player, the game system 50 communicates with the server 80 over the network 6. The game system 50 communicates on the bi-directional control interface 51, with a bi-directional control interface 88 of the server 80. The game system 50, on interfacing with the application running on the server 80, is provided with a graphical interface rendered to the display associated with the game system 50 that shows previous interactive games that are available to be accessed. The game system 50, under control of a non-interactive games player, may select a previously played game stored at the server 80. The game data is transmitted on network interface 86 and received on network interface 52 by the game system 50. The game may be downloaded in its entirety and stored at the game system 50 or may be downloaded and used by the game system 50 as it is received.

In this way the game system 50 is able to replay a previous interactive game and, in dependence on the data received on the interface 50, is able to display the previous interactive game by rendering the data. The game system 50 renders the data in exactly the same way it would in receiving the data in real-time during an interactive game session. In addition, the game system 50 may receive user data on interface 53 from the controller 55 and render this data appropriately to the display of the system alongside the replayed interactive game.

As described hereinabove with reference to the arrangement of FIG. 2, a non-interactive game player may then play alongside an interactive game, the only difference being that this is a replayed game rather than a real-time game.

Figure 5B:
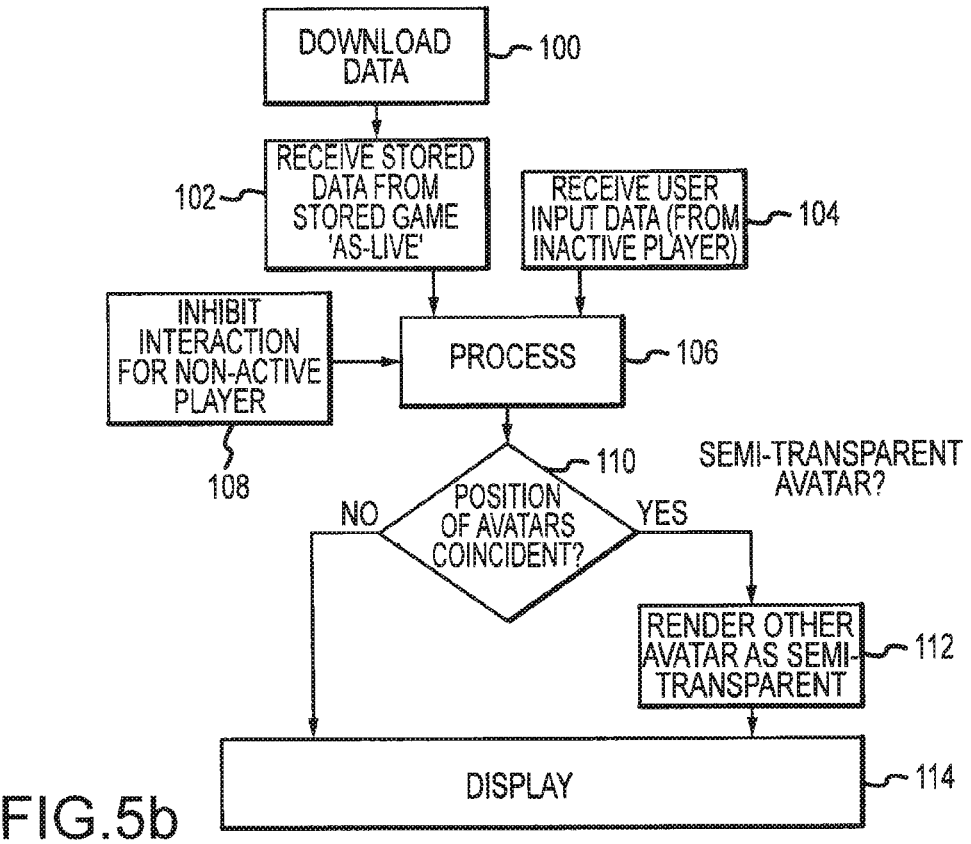

The operation of the game system 50 in accordance with this arrangement is described further with reference to FIG. 5b.

In a step 100 the game system 50 downloads data from the server 80. In a step 102 the game system 50 receives the interactive games data from the server 80. This data is received "as-live", such that the interactive game can be rendered from the data and displayed to the display of the game system. Data may be downloaded from the server and rendered as it is received, or may be downloaded from the server and stored at the game system and rendered as it is accessed from the game system memory. In addition the game system receives the user input data from the non-interactive player on interface 53, as denoted by step 104.

In a step 106 processing of the interactive game data and the user input data takes place, e.g., by operation of the game system 50 and/or its processor(s). As noted by input from step 108, interaction of the non-interactive player with the interactive game is inhibited.

In a step 110, similar to step 68 of FIG. 3, it is determined whether the position of an avatar associated with a non-interactive player coincides with an avatar of an interactive element of the replayed interactive game. In the event that such coincidence is detected, in a step 112 the avatar of the interactive element is rendered semi transparent. In a step 114 the replayed interactive game is rendered to the display, alongside the avatar for the non-interactive player.

In this arrangement the interactive game is replayed in dependence on the data generated during the interactive game, which has been stored, and not as a movie or video. Thus the computer game system of a non-interactive player receives the interactive game data and renders the game to the display 'as-live'. In addition the computer game system renders the user input data from the controller of the non-interactive player. Thus the non-interactive player plays alongside the replayed interactive game.

The application is preferably controlled such that no interaction is allowed between the avatar of the non-interactive player and the avatars of any interactive data of the replayed interactive game. If such interaction is permitted, the game may be required to terminate as soon as an interaction occurs, e.g. in a racing game as soon as a collision occurs, as the flow of the game is then lost.

In this arrangement it is not essential for a server to store previous games. A games system such as games system 50 may store an interactive game as it is played, for later use. A games system may need to register to a game—as interactive player or non-interactive player—to receive the game data.

In this arrangement there is thus provided a method of playing a computer game including: downloading a previously played computer game replaying the downloaded game; and playing the downloaded game.

In this arrangement there is also thus provided a method of playing a computer game including: saving a previously played computer game; replaying the saved game; and playing the saved game.

Figure 6:
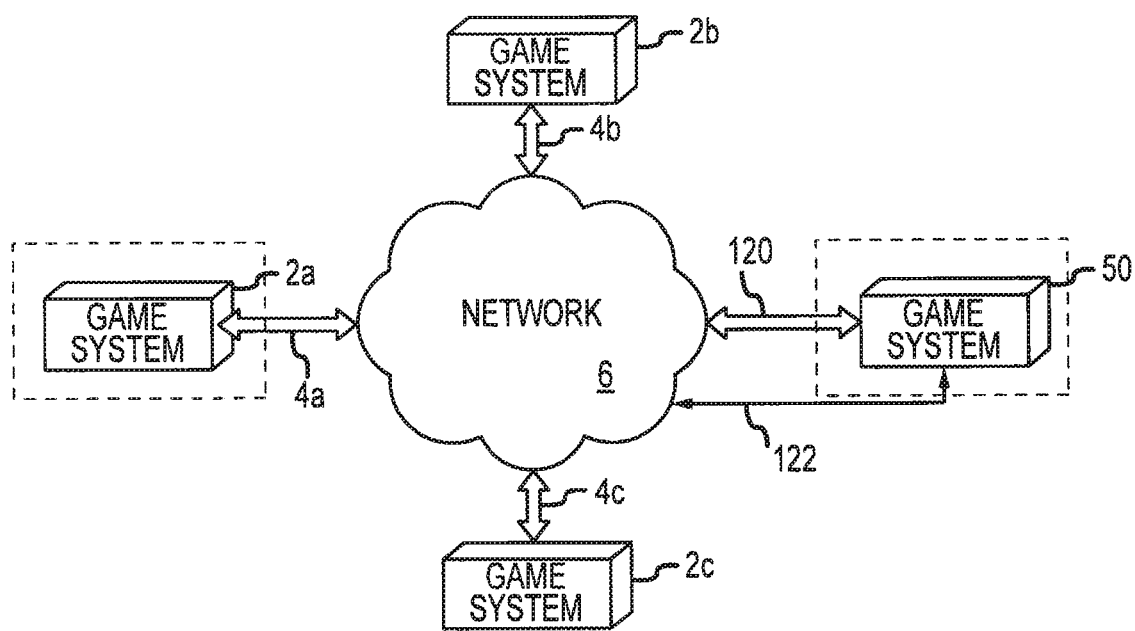
FIG. 6 illustrates an architecture to support an interactive computer gaming session between multiple users in a network environment adapted in accordance with a still further embodiment of the invention.

In a further arrangement, a game application is modified to provide for a non-interactive game player's avatar to be displayed to one or more players of the interactive game. This further arrangement is described with reference to FIGS. 6 and 7.

This further arrangement requires the computer game terminal of the non-interactive player to broadcast the user data of the non-interactive player to the computer game systems of the interactive players. As a non-interactive player, however, the non-interactive user's avatar is still not enabled to interact with an interactive player's avatar. Thus, in a racing game, the avatar of a non-interactive user 'ghosts' through another car in the event of a collision, e.g. by being rendered as semi-transparent.

With reference to FIG. 6, there is again illustrated the general interactive network game environments of FIG. 1, showing interactive game systems 2a, 2b, 2c. Also illustrated is the non-interactive game system 50. In this further arrangement the non-interactive game system 50 is adapted to transmit the games data associated with the controller of the game system 50 on interface 120 to the network 6, as well as receiving games data from the interactive game systems on the network interface 120. The game system 50 is associated with bi-directional control signals 122, which allow control information to be passed between the interactive game systems as well as the non-interactive system 50, for example during registration for the game.

In addition, one or more of the interactive game systems 2a, 2b, 2c are adapted to allow the user thereof to display the avatar associated with the non-interactive game player. The user of an interactive game system such as game system 2a may have the option, during the registration process in the games lobby, to select one or more non-interactive games players such that the games data associated with that player will be rendered to the display of their game system. Alternatively the user associated with the game system 2a may be able to access an option during a game play to identify any non-interactive game players and render their data. The game system application of an interactive game player is therefore adapted to allow rendering of an avatar associated with a non-interactive game player, but as described previously hereinabove with reference to other arrangements, as the games player is non-interactive then any interaction between such avatar and interactive elements of the game is preferably inhibited.

Figure 7:
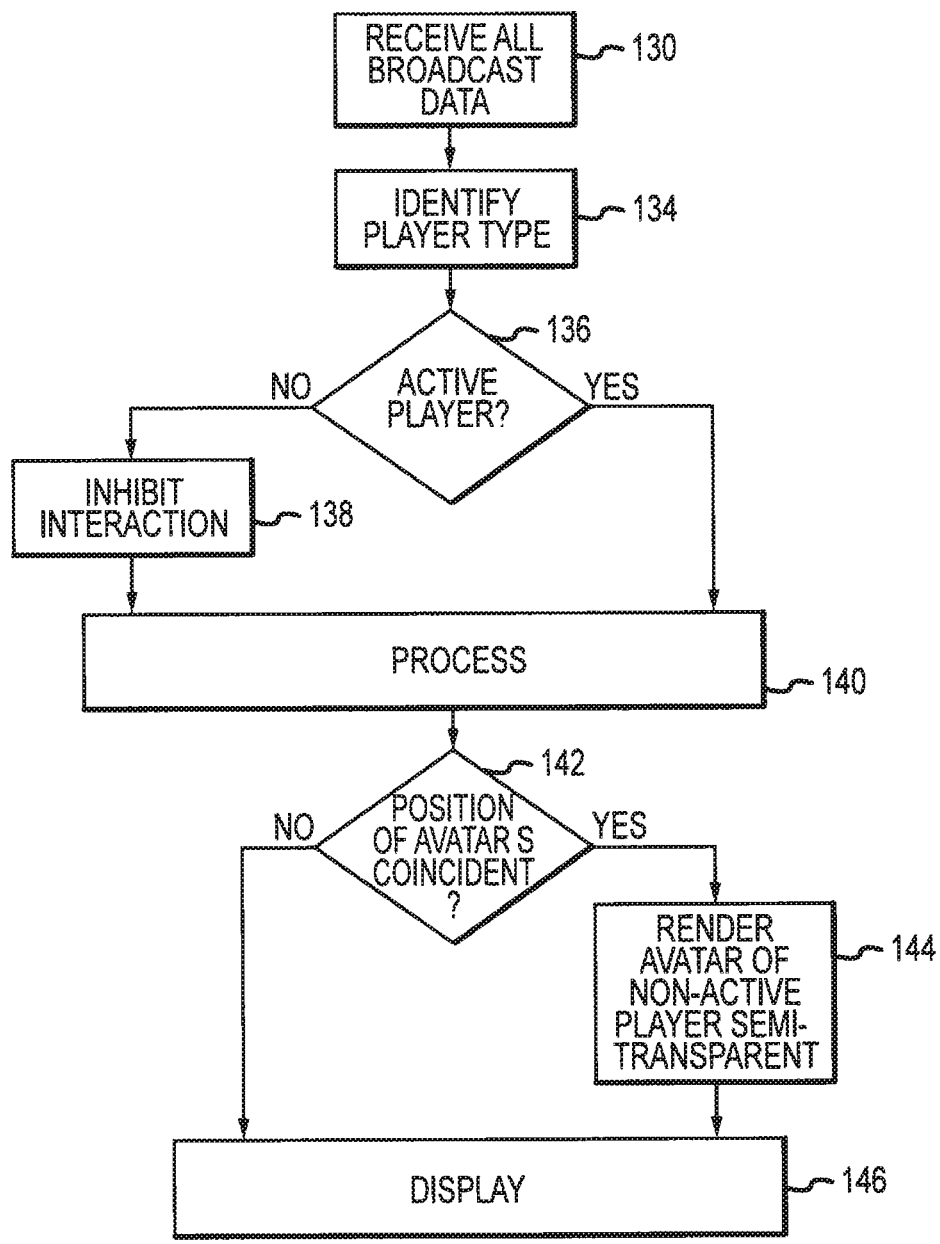
FIG. 7 shows a flow diagram of the main process steps for adapting a computer games system for the architecture of FIG. 6.

This further arrangement is described in more detail with reference to the flow process of FIG. 7. In a step 130 an interactive game system, such as game system 2a, receives all broadcast data on an interface 4a. This is a conventional arrangement, where any interactive game system receives interactive game data. The received interactive game data includes game data, including user input data, from one or more non-interactive game systems, such as game system 50.

In a step 134 the game system 2a identifies the player type of the game data received from each player. Thus game data is determined as being associated with either an interactive player or a non-interactive player. In the event that game data is identified in a step 136 as being associated with a non-interactive player, then in step 138 any interaction associated with such data is inhibited. In a step 140 the game data is then processed.

In a step 142, similar to step 68 of FIG. 3, it is determined whether the position of an avatar associated with an active player is coincident with an avatar of a non-interactive player. In the event that a positive determination is made, then in a step 144 the avatar of the non-interactive player is rendered as semi-transparent. In a step 146 the appropriate games data is displayed to a display associated with the game system 2a.

Thus in this further arrangement, an application running on an interactive game system is further adapted in order to be able to distinguish between game data associated with interactive players and non-interactive players. The game system associated with a non-interactive player is adapted to transmit user input data for that game system to the network. However this games data may in any event be made available in other arrangements, the game systems of interactive players being adapted to determine whether that data is processed or ignored. There is thus provided a method for participating in a multi-user interactive game that includes: receiving interactive game data generated by computer game consoles of a plurality of active players in a game; receiving user input data generated by a user input device of a non-active player of said game; and displaying the game in dependence on the interactive game data and the user input data.

In the further arrangement further modifications may be applied. In an interactive computer game, in addition to all interactive game terminals being able to receive game data from the various interactive game systems, other levels of interaction may be provided. For example, interactive game players may be able to talk and listen to each other. In the arrangement described hereinabove, where an interactive game player selects the option to allow an avatar associated with a non-interactive game player to be displayed on their display, it may select to allow or to not allow (or block) any voice data from the non-interactive games player to be played.

Similarly in an arrangement in which a non-interactive player is allowed to receive interactive game data from a number of interactive players during an interactive game, the configuration of the interactive game may limit the data available to non-interactive games players. Thus the necessary data to render images to the display, and associated sounds with interactions of those images, may be transmitted to the non-interactive player. However voice data associated with the interactive players of the game may not be transmitted from the interactive games consoles. Thus the interactive games data broadcast may be restricted or limited compared to that which is available to the interactive game players.

Various aspects of the various described arrangements may be combined, no described arrangement being limited to a stand-alone arrangement. In a preferred implementation, all described arrangements are implemented together. Various additional modifications and variations to the invention and its described embodiments will be apparent to one skilled in the art. All deviations from the specific teachings of this specification that rely upon the principles and their equivalents through which the art has been advanced are within the scope of the invention as described and claimed.

For example, the above description comments on the usefulness of the described techniques in providing enhanced operations in the case of an interactive game involving multiple interactive networked players, and particularly for an interactive racing game. The techniques are readily applicable to many other interactive game settings in which a player moves a user-controlled character (avatar) through a virtual game world, interacts with game (or other user) controlled characters (avatars) or objects, including responding to the interaction by selecting particular behaviors or actions for their user-controlled characters, and views the actions of the game controlled characters as they respond to these behaviors or actions.

An embodiment of the invention may include a video game device capable of executing a video game program that incorporates the applications in arrangements discussed above. While such an interactive game program can be executed under any computer system capable of communicating with other devices, the following description is directed to an interactive game program being executed by an interactive game device (e.g., a particular example of an information processing device or computing device) which may be a standalone device for one or more users or a device capable of communicating with other devices. The invention is not limited to use to a particular interactive game device, but it may be implemented with any interactive game device capable of executing an interactive game program according to the present invention, such as a portable interactive game device, an interactive game device adapted for use with a television or other monitor, a computer such as a desktop, laptop, notebook, or other computer, a telephone such as a cellular phone, or any other electronic device adapted for running an interactive game program including the animation methods of the invention.

Figure 8:
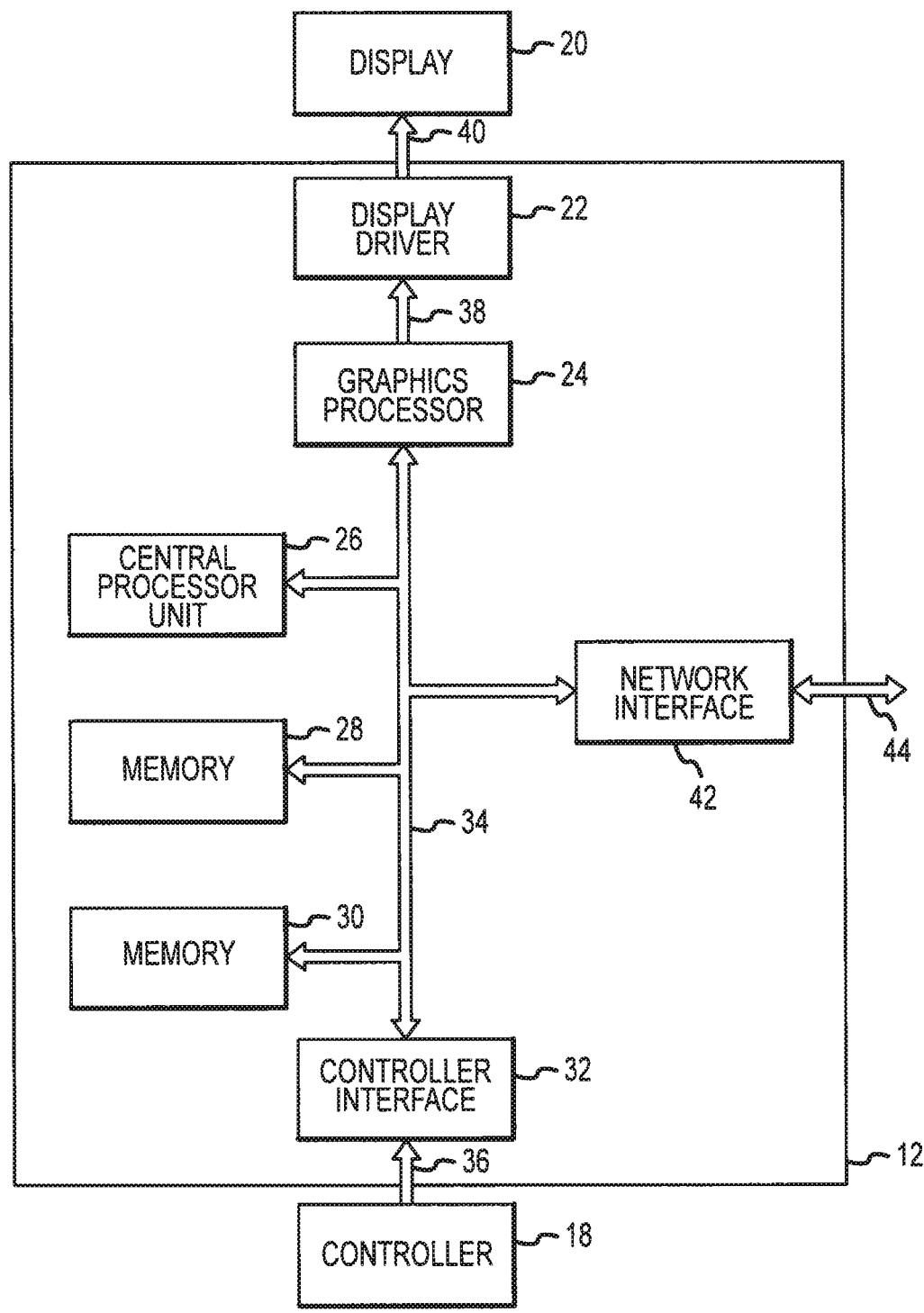
FIG. 8 illustrates the main functional elements of a computer games console.

An example interactive game device or system that may be used as an interactive or non-interactive games system is shown in FIG. 8 and denoted by reference numeral 12. The device includes a graphics processor 24 controlling a display driver 22 via a graphics bus 38, a controller interface 32 receiving controller data on a controller interface bus 36, a central processor unit (CPU) 26, a network interface 42 connected to a network bus 44, and memory modules 28 and 30. A system bus 34 connects various elements. The display driver 22 drives the display 20 via display bus 40.

The example interactive game device of the invention may include one or more monitors on which graphics may be displayed such as one or more LCDs (Liquid Crystal Displays) and such a display or monitor may be provided within the game housing or as a separate monitor (such as a television). While LCDs are one preferred embodiment, the monitor or display device may be of any other suitable type, e.g., an EL (Electro Luminescence), a CRT, or other display device. Moreover, the resolution of the monitor or display device is not limiting and may vary to practice the invention. One or more speakers allowing game sounds to pass through may also be provided as part of the interactive game device or external speakers may be used such as provided in a television or attached to the game device. The interactive game device may include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of a second LCD. The housing in many embodiments includes slots for accommodating a memory card (e.g., a game cartridge). The memory card or game cartridge is a storage medium storing the interactive game program run by the interactive game device and, typically, for storing the animations described herein. In other embodiments, though, the interactive game program(s) and graphics may be accessed via a communications network such as the Internet (as described herein).

In implementations in which the video game device is a portable device or is a device that is linked to a television or other monitor/speaker system, the internal configuration of the video game device may include a CPU 26 mounted on an electronic circuit board positioned in the game housing. The CPU 26 may be connected to an input/output interface circuit one or more GPU (Graphics Processing Unit) 24 and a monitor controller as display driver 22 such as via bus 34. A connector or memory interface may be provided for receiving a memory card, which may include ROM storing the video game program including the animations and RAM such as for rewritably storing backup data (e.g., memory 28, 30, or the like). The video game program stored in the ROM of the memory card is typically loaded to the RAM, and the loaded video game program in memory 28 and/or 30 is executed by the CPU 26 during operation of the video game device 12. In addition to the video game program, the RAM 28 and/or 30 also stores temporary data produced while the CPU 26 is running a program. The input/output circuit may be connected to the user inputs or control switch section (e.g., user interface) and monitor. Video RAM or VRAM may be used to provide storage of animations or images rendered according to the invention and may be stored in RAM prior to display by the GPU or other graphics controllers. Memory blocks 28 and 30 connected to bus 34 represent different possible types of memory.

As will be clear to those skilled in the arts, numerous embodiments of interactive game apparatus and interactive game controllers may be used to practice the present invention, e.g., to run the methods described herein as part of an interactive video game program stored on storage medium such as memory card, game cartridge, or the like, and the above description of an interactive game device is not intended to limit the breadth of coverage. For example, the interactive game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the interactive game may be run remotely or after storage on local memory.

The invention claimed is:

1. A method of operating an interactive computer game on a computer games terminal, comprising:

concurrently receiving, at the computer games terminal:
    non-interactive user input data from a controller associated with the computer games terminal and operated during the interactive computer game to produce the non-interactive user input data, wherein the non-interactive user input data includes control information for playing the interactive computer game; and
    interactive game data associated with at least one interactive game element from an additional computer games terminal operated during the playing of the interactive computer game;
during the playing of the interactive computer game, rendering the non-interactive user input data and the interactive game data for display by the computer games terminal and not by the additional computer games terminal, wherein the rendering includes concurrently rendering the interactive game element and a game element associated with a non-interactive games player based on the received control information; and
inhibiting any interaction between the non-interactive user input data and the interactive game data, wherein the inhibiting includes preventing any interaction between the interactive game element and the game element associated with the non-interactive games player,
wherein the interactive game element and game element associated with the non-interactive games player are first and second avatars, respectively, and
wherein the step of rendering the non-interactive user input data and the interactive game data for display includes detecting a coincidence between the position of the second avatar for display associated with the user input data and the first avatar for display associated with the received interactive game data, and responsive thereto to render one of the first and second avatars semi-transparent.

2. A method according to claim 1 wherein the rendering the non-interactive user input data and the interactive game data for display is independent of any interaction between said data.

3. A method according to claim 1 further comprising processing the received user input data and the interactive game data, the processing being adapted to inhibit any interaction between a displayed avatar associated with the user input data and a displayed avatar associated with the received interactive game data.

4. A method according to claim 1 further including inhibiting the transmission of the non-interactive user input data to a computer games system associated with the received interactive game data.

5. A method according to claim 4 wherein the inhibiting comprises inhibiting transmission to a network.

6. A method according to claim 1 wherein the interactive game data is real-time interactive game data.

7. A method according to claim 1 wherein the interactive game data is pre-stored interactive game data.

8. A method according to claim 1 wherein the interactive game data includes user input data from at least one further computer games terminal.

9. A method according to claim 1 wherein the non-interactive user input data is associated with a user being a non-active game player and wherein the control information is processed to allow the non-active game player to control movement of the game element in the interactive computer game without interaction with the interactive game element.

10. A method according to claim 1 wherein the step of receiving interactive game data includes receiving said data from a network.

11. A computer game terminal for operating an interactive computer game, comprising:
    an interface for receiving non-interactive user input data from a controller associated with the computer game terminal and operated during the interactive computer game, the computer game terminal being registered for use by a non-interactive player of the interactive computer game;
    an interface for receiving interactive game data associated with at least one interactive game element from another computer game terminal registered for use by an active player of the interactive computer game, wherein the another computer game terminal is operated during the interactive computer game to generate at least a portion of the interactive game data concurrently with generation of the non-interactive user input data;
    a display driver for rendering, during the interactive computer game, a graphical representation of a computer game based on the non-interactive user input data and the interactive game data, the graphical representation including a first avatar based on the non-interactive user input data and a second avatar based on the interactive game data; and
    a processor for processing the received non-interactive user input data and the interactive game data, the processing inhibiting any interaction between first and second avatars and for determining when positions of the first and second avatars are coincident and, in response to the determining of coincidence, rendering one of the first and second avatars as semi-transparent.

12. A computer game terminal according to claim 11 wherein the processor processes the received non-interactive user input data and the interactive game data, the processor being adapted to inhibit any interaction between such data.

13. A computer game terminal according to claim 11 wherein the interface for receiving interactive game data is a network interface.

14. A computer game terminal according to claim 13 wherein the interactive game data is user input data associated with a further computer game terminal.

15. A computer game terminal according to claim 11 wherein the interactive game data is associated with a computer-generated interactive game element.

16. A computer game terminal according to claim 11 further comprising an interface for transmitting user input data from the controller associated with the computer games terminal, said interface being arranged in a non-interactive mode of operation to inhibit said transmission.

17. A non-transitory computer program for operating an interactive computer game on a computer games terminal and for carrying out a method comprising the steps of:
    concurrently receiving, at the computer games terminal:
        non-interactive user input data from a controller associated with the computer games terminal and operated during the interactive computer game to produce the non-interactive user input data, the non-interactive user input data defining movement of a first game element for the interactive computer game; and
        interactive game data associated with at least a second game element for the interactive computer game from a computer games terminal associated with a player registered as an interactive player for the interactive computer game and operated during the interactive computer game; and rendering the non-interactive user input data and the interactive game data for display including determining whether the first and second game elements coincide and, when determined to be coinciding, displaying the first or second game element as semi-transparent, wherein the non-interactive user input data is processed to inhibit interaction between the first and second game elements.

18. A computer program product for storing a non-transitory computer program code for carrying out a method of operating an interactive computer game on a computer games terminal, comprising the steps of:

concurrently receiving, at the computer games terminal:
non-interactive user input data from a controller associated with the computer games terminal and operated during the interactive computer game, the non-interactive user input device including data for playing the interactive computer game; and
interactive game data associated with at least one interactive game element from an additional computer games terminal operated during the playing of the interactive computer game; and concurrently rendering the non-interactive user input data and the interactive game data for exclusive display on a display associated with the computer games terminal, the rendering including processing the game playing data from the controller associated with the computer games terminal without interfering with behavior of the at least one interactive game element in the interactive computer game, wherein the rendering includes creating a first avatar based on the non-interactive user input data and a second avatar based on the interactive game data, and wherein the rendering includes detecting a coincidence between positions of the first and second avatars, and, in response, displaying on the display one of the first and second avatars as semi-transparent.

19. A method of operating an interactive computer game on a plurality of computer game terminals, comprising the steps of:

concurrently receiving, at a first computer games terminal registered for use by a non-interactive game player for the interactive computer game:
non-interactive user input data from a first controller associated with the first computer games terminal and operated when the interactive computer game is being played; and
while the interactive computer game is being played, interactive user input data from two or more controllers associated with a plurality of second computer games terminals each registered for use by interactive game players for the interactive computer game; and while the interactive computer game is being played, rendering a graphical representation of the computer game at the first computer game terminal based on the non-interactive user input data and the interactive user input data, the graphical representation including a game element controlled by the non-interactive user input data and a game element controlled by the interactive user input data, wherein the rendering at the first computer game terminal inhibits interaction between the game elements and, when in coinciding positions, includes rendering one of the game elements as semi-transparent;

receiving, at each of the second computer games terminals the interactive user input data; and rendering a graphical representation of the computer game at each of the second computer game terminals based on the interactive user input data and free of the non-interactive user input data.

20. A network of interconnected computer games terminals each adapted for operating an interactive computer game, the network comprising:

a plurality of first computer game terminals, each comprising:
an interface for receiving interactive user input data from a controller associated with the computer games terminal;
an interface for receiving interactive user input data from a controller associated with the plurality of other first computer game terminals; and
a display driver for rendering a graphical representation of a computer game based on the interactive user input data of each of the plurality of first computer game terminals; and at least one second computer game terminal, each comprising:
an interface for receiving non-interactive user input data from a controller associated with the second computer game terminal;
an interface for receiving the interactive user input data from each of the plurality of first terminals, wherein the interactive user input data and the non-interactive user input data are concurrently generated during a single, live game session of the interactive computer game; and
a display driver for rendering a graphical representation of the computer game based on the non-interactive user input data of the second computer game terminal and the interactive user input data of each of the first computer game terminals, wherein the non-interactive user input data and the interactive user input data are generated concurrently by two or more players, wherein the graphical representation in the second computer game terminal includes game elements rendered based on the interactive user input data along with a game element rendered based on the non-interactive user input data and the graphical representations displayed on the first computer game terminals is free of representations of the game element based on the non-interactive user input data, wherein the game element rendered based on the non-interactive user input data is inhibited from interaction with the game elements rendered based on the interactive user input data and, when the game element rendered based on the non-interactive user input data is in a position that coincides with one of the game elements rendered based on the interactive user input data, one of the game elements is rendered in the second computer game terminal as semi-transparent.

* * * * *